T. E. CHAPPELL.
MACHINE FOR TRIMMING COMMUTATORS.
APPLICATION FILED SEPT. 14, 1910.

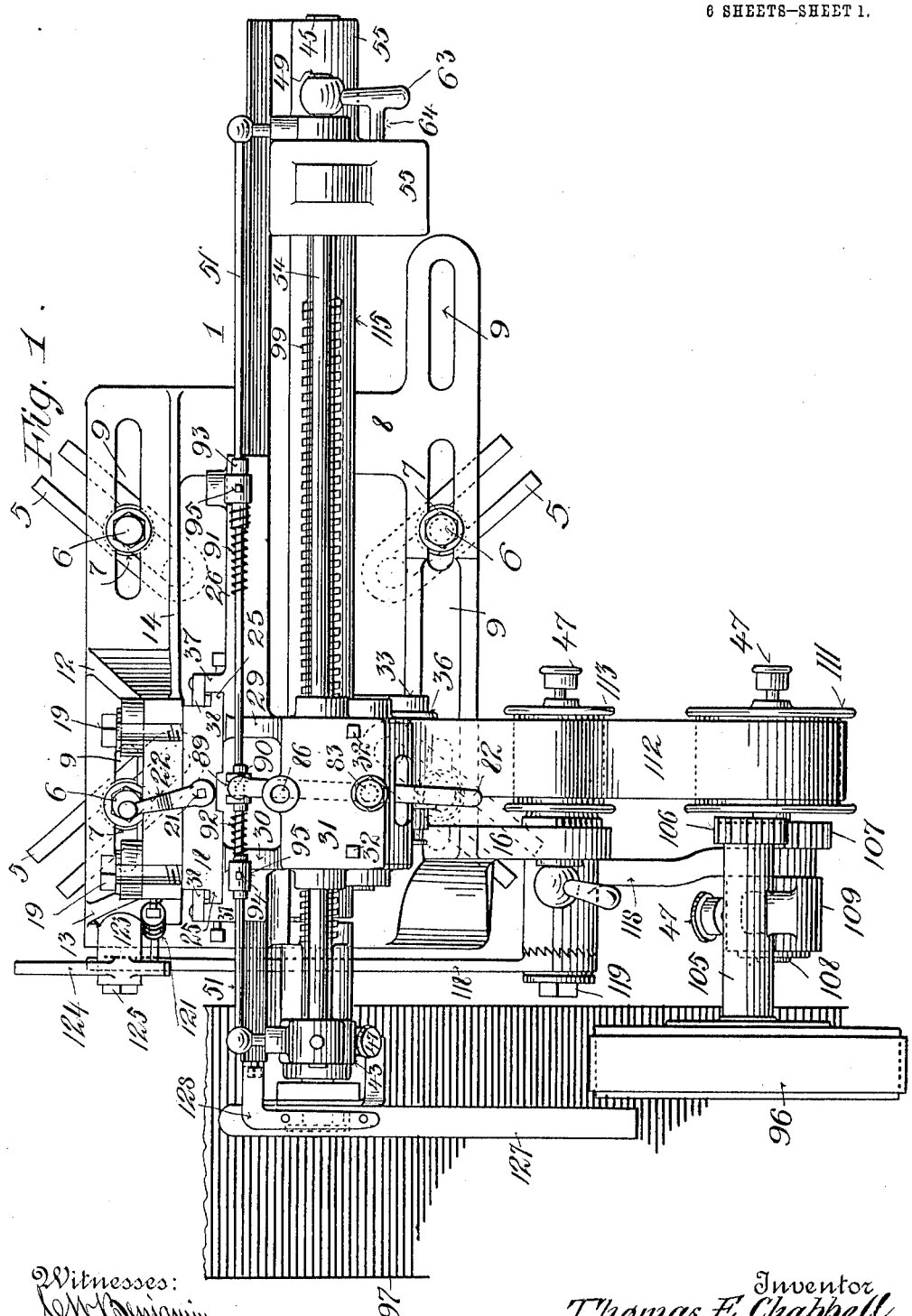

1,072,410.

Patented Sept. 2, 1913.

6 SHEETS—SHEET 2.

Witnesses:
Inventor
Thomas E. Chappell
By his Attorney
O. Ellery Edwards Jr.

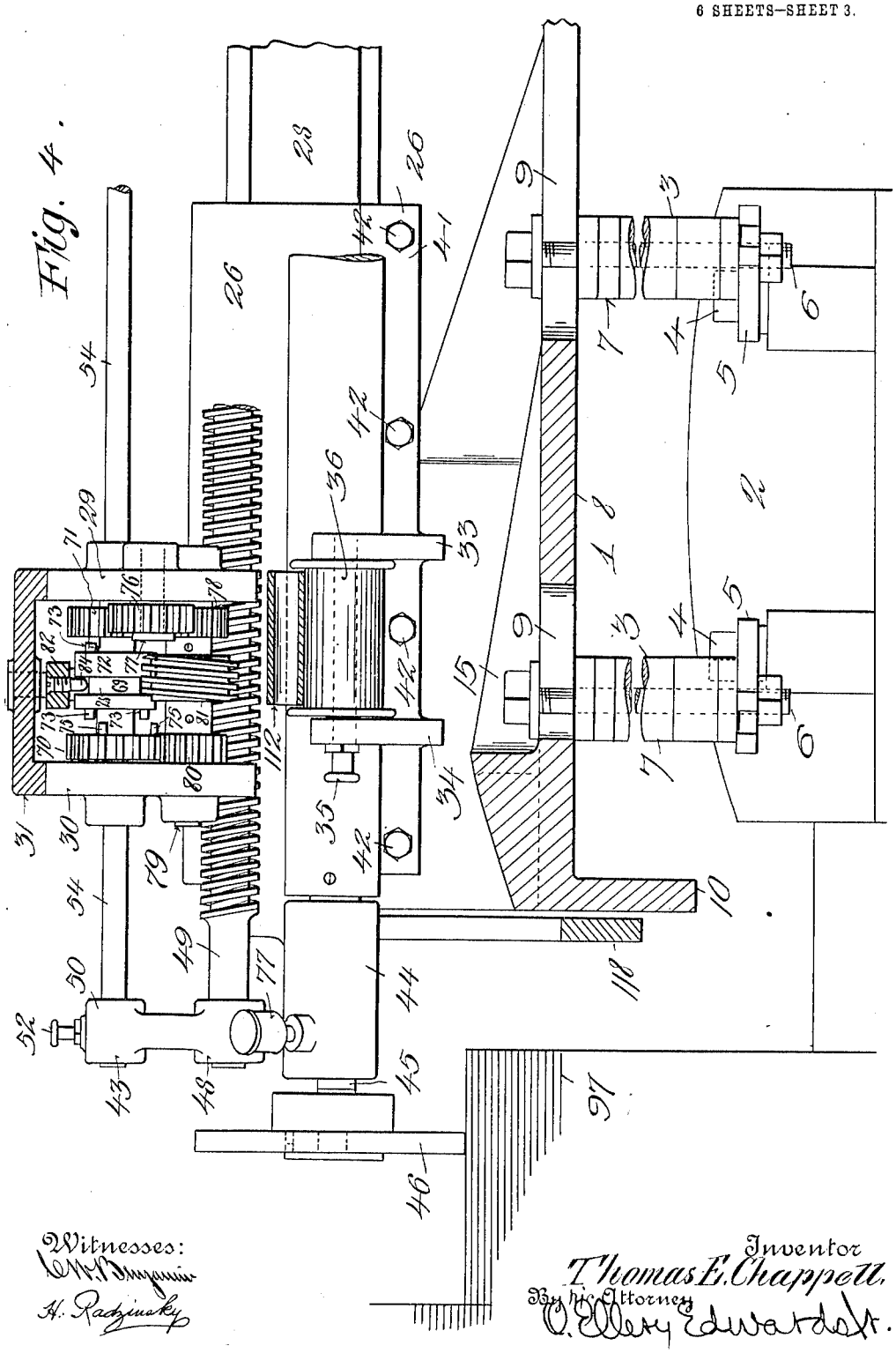

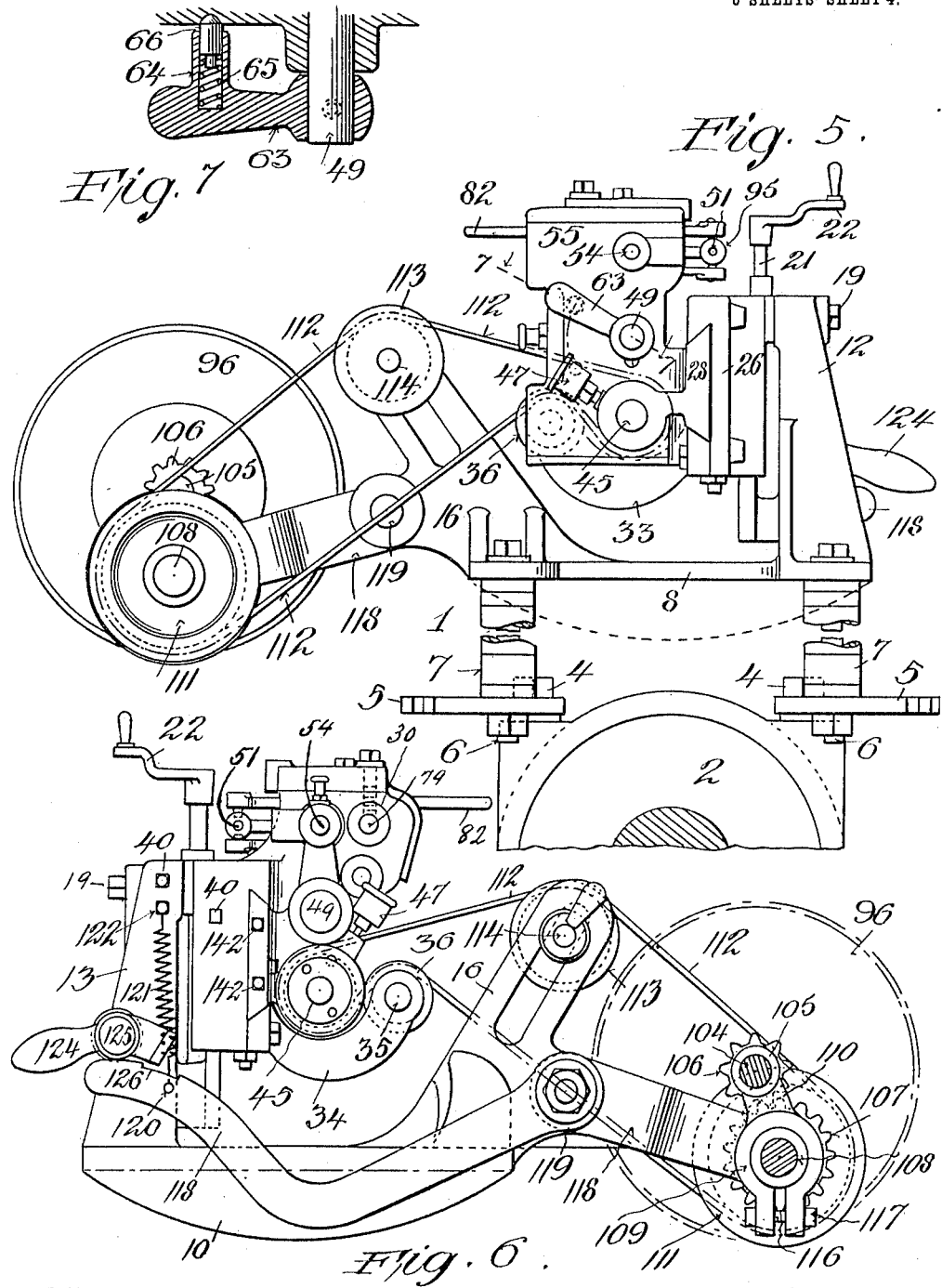

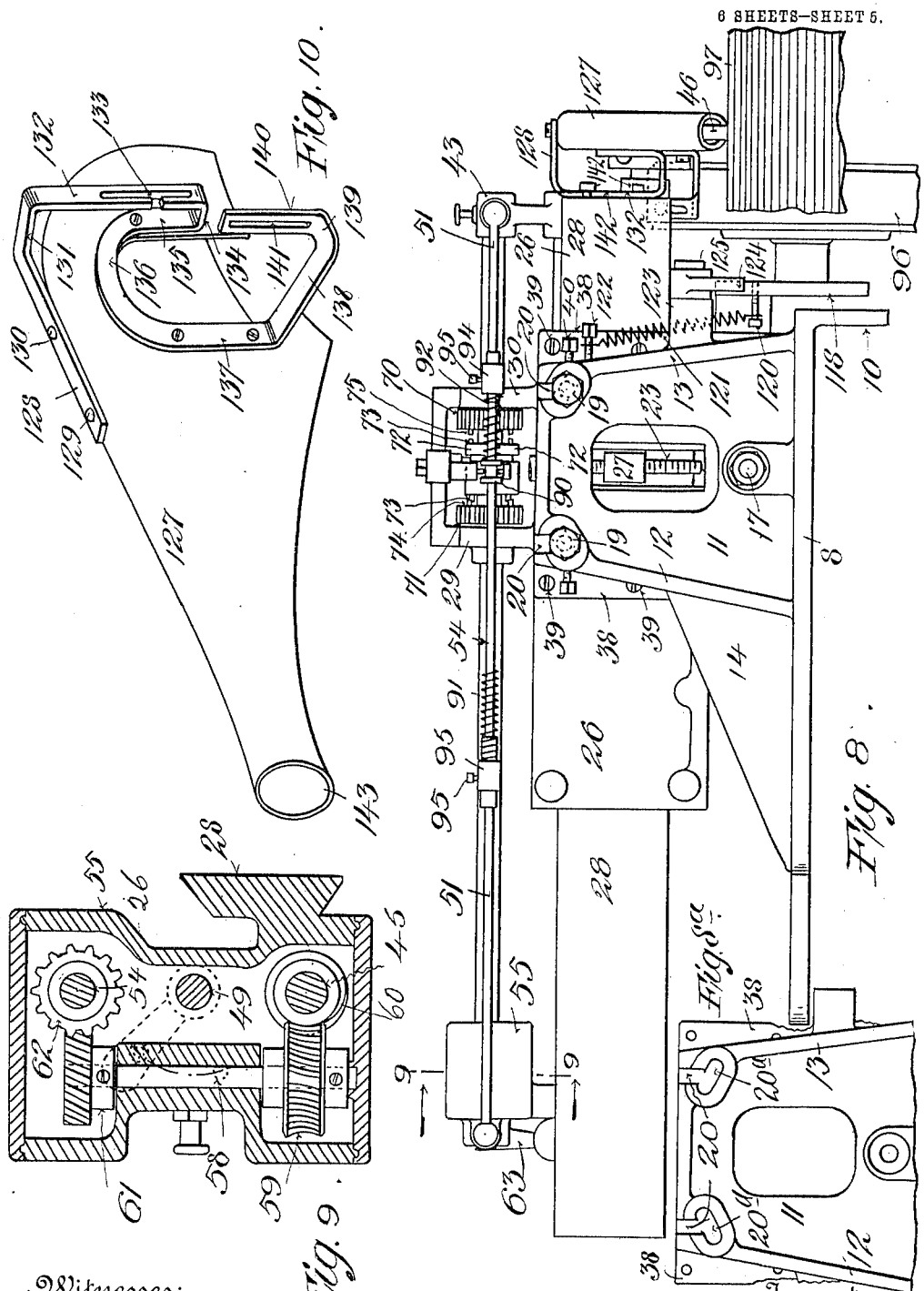

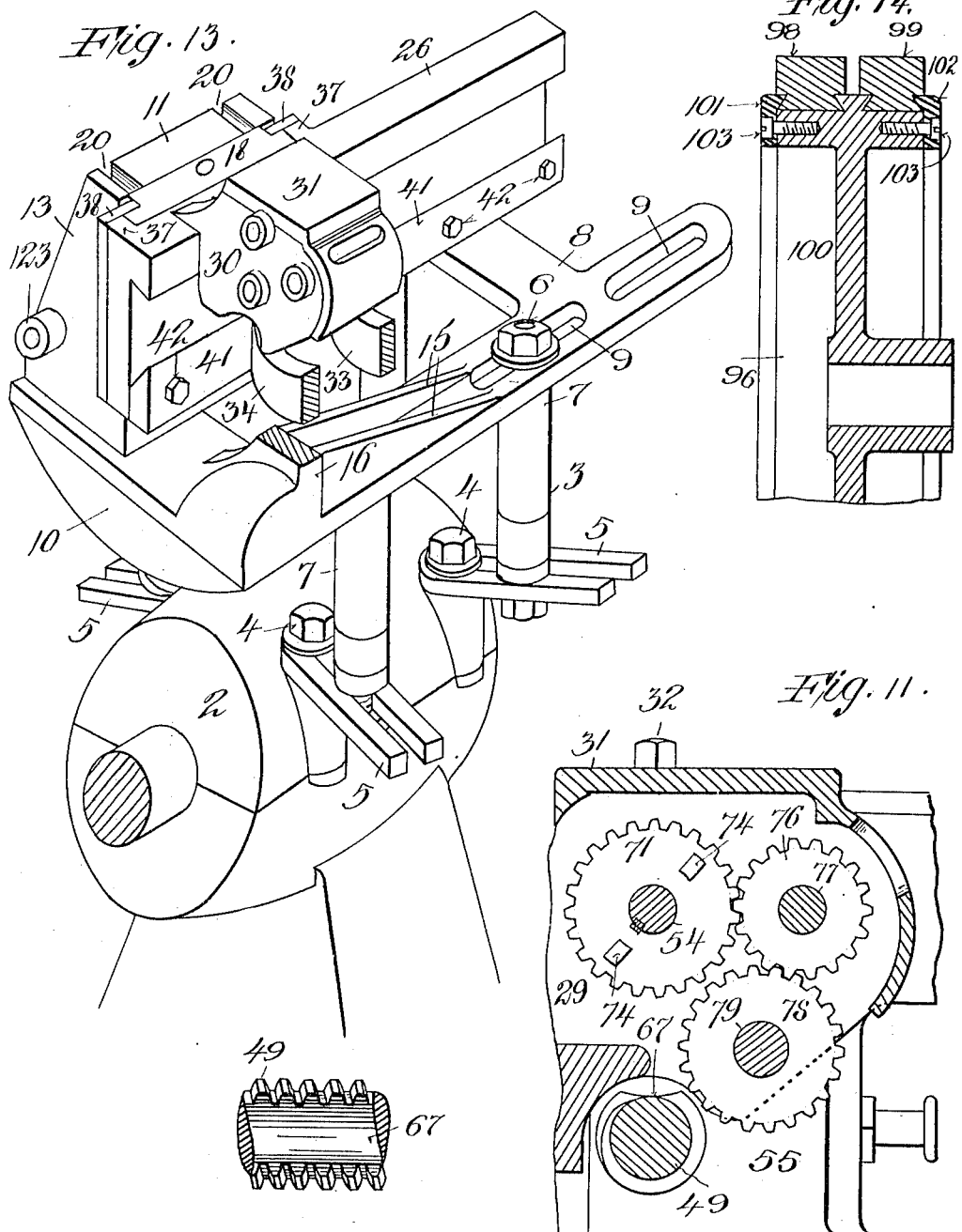

UNITED STATES PATENT OFFICE.

THOMAS E. CHAPPELL, OF NEW YORK, N. Y., ASSIGNOR TO PHILLIPS MANUFACTURING COMPANY, OF NEW YORK, N. Y., A CORPORATION OF NEW YORK.

MACHINE FOR TRIMMING COMMUTATORS.

1,072,410.

Specification of Letters Patent.

Patented Sept. 2, 1913.

Application filed September 14, 1910. Serial No. 582,021.

*To all whom it may concern:*

Be it known that I, THOMAS E. CHAPPELL, a citizen of the United States, and a resident of New York city, county of Kings, and State of New York, have invented a new and useful Improvement in Machines for Trimming Commutators, of which the following is a specification.

The object of my invention is to provide a machine of the class which will true any commutator howsoever large and do the same accurately, either when the armature is in a lathe or while the commutator is running under normal conditions and in place, and do this without any possible injury to the machine, and if necessary, do this while the commutator is charged with electricity, as in the case of rotary converters. This object is accomplished by my invention which has the following special features: It has a mount which enables the operator to place it securely and fix it by the cover bolts, and this mount may, if desired, be insulated so that the trimming apparatus has no electrical contact or connection with the frame of the machine being trimmed.

Commutators revolve at a high speed and have their segments separated by mica or other insulating material. Any truing device has to cut not only the mica but also the copper, the most difficult of metals to cut, and to do so will, unless provision is made, scatter fragments of copper where some of them will be blown into the winding of the armature, thereby causing, or tending to cause, a short circuit. By my invention I provide an exhaust which takes away all of these fragments and thereby insures the machine against injury.

Yet another feature of my invention is the concealing of all gears so the same can be properly housed and kept free from dust or anything else that is likely to interfere with the operation of the machine. This feature also makes the machine safer for the operator.

Yet another feature is the making of the parts so that the apparatus can be readily mounted on any machine under treatment.

These, and other objects, are accomplished by my invention, one embodiment of which is described below.

Figure 3:
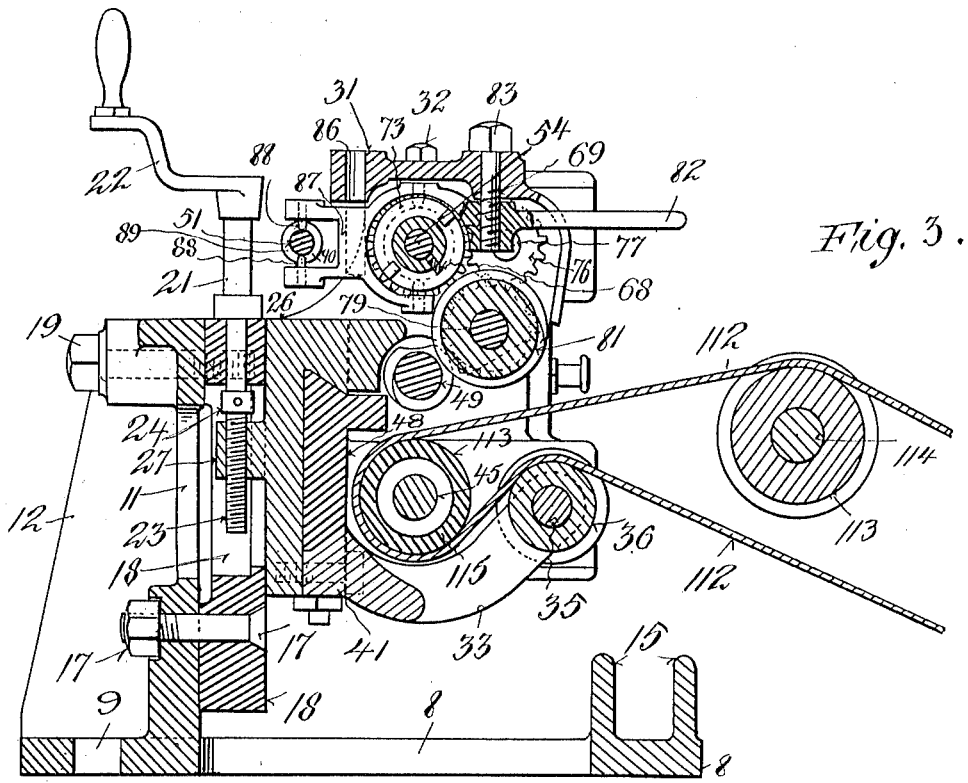
Figure 2:
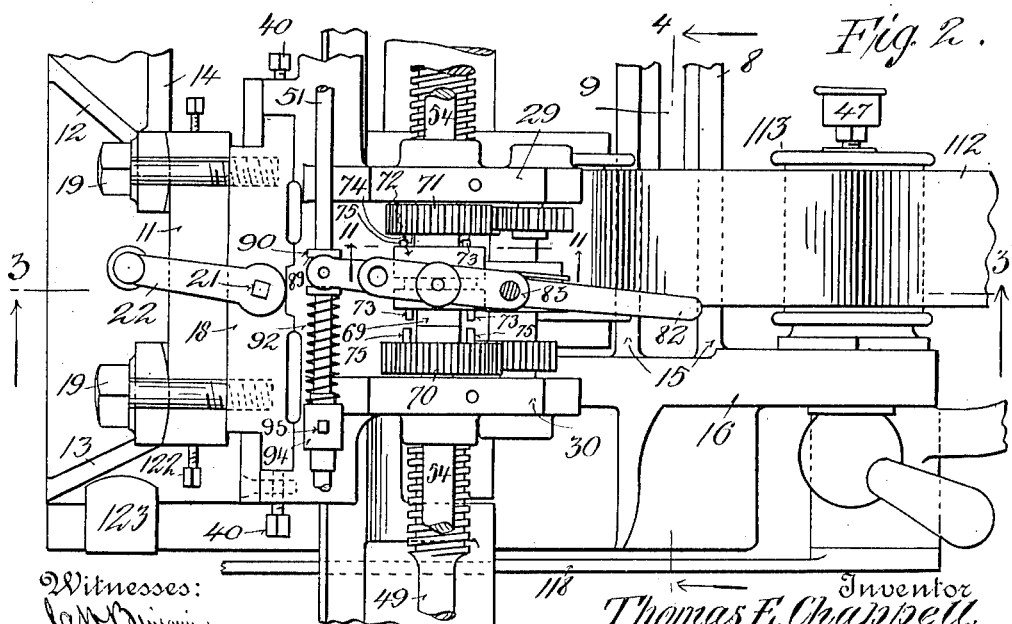

For a more particular description of my invention, reference is to be had to the accompanying drawings, forming a part hereof, in which:

Figure 1 is a plan view of a machine embodying my improvements, a portion of the commutator of a machine under treatment being also shown. Fig. 2 is a plan view, partially in section, of a portion of the mechanism which determines the movement of the grinding apparatus. Fig. 3 is a sectional view taken on the line 3—3 of Fig. 2, looking in the direction of the arrows. Fig. 4 is a sectional view, taken on the line 4—4 of Fig. 2, looking in the direction of the arrows, Fig. 4 showing parts that are not shown in Fig. 2, and being more extended for this purpose. Fig. 5 is an end elevation of my improved machine, the outside end being shown, that is the end removed from the commutator under treatment. Fig. 6 is an end elevation of the opposite end of the machine. Fig. 7 is a sectional view taken on the line 7—7 of Fig. 5, looking in the direction of the arrows. Fig. 8 is a rear elevation of my improved machine, that is the side opposite that on which the grinding wheel is placed. Fig. 8$^a$ is a detail of web 11. Fig. 9 is a sectional view taken on the line 9—9 of Fig. 8, looking in the direction of the arrows. Fig. 10 is a perspective view of a hood which covers the grinding wheel. Fig. 11 is a sectional view taken on the line 11—11 of Fig. 2, looking in the direction of the arrows. Fig. 12 is a perspective view of a portion of a lock the lock being in the form of a screw with interrupted threads. Fig. 13 is a perspective view of the mount and portions of my improved machine. The view is, in part, a sectional one of the machine so as to more clearly reveal the structure. Fig. 14 is a sectional view showing an improved form of friction wheel which runs on the commutator and receives power therefrom to drive the trimming apparatus.

Throughout the various views of the drawings, similar reference characters designate similar parts.

My improved machine 1 is mounted on any suitable electrical machine 2 such as a rotary converter (a few of the brushes of which have been removed, if necessary, to allow plenty of room for my improved machine). The mount 3 for my machine is as follows: The original cover bolts are withdrawn and longer bolts 4 substituted, and these cover bolts 4 secure suitable horse shoe bars 5 in place. These horse shoe bars 5 are bent so as to have parallel arms separated by the thickness of the bolts 4 so that when these bolts 4 are secured in place, they clamp the bars 5 and hold the same in any desired position. If desired, these horse shoe bars 5 may be insulated from the machine by suitable washers, or other means, as is apparent. These bars 5 each support a bolt 6, of the conventional form, that is surrounded by suitable washers 7 which may be either of metal or of some insulating material, and in that event additional bushings are employed to separate the bolts 6 from both the bars 5 and the base 8 of the machine 1. Great care must be taken in the event that a commutator is being trued which is charged with electricity to prevent any electric current becoming "grounded" through the truing apparatus. It is obvious that the number of washers 7 which are employed will depend entirely upon the size of the commutator and its location with regard to the cover bolts 4 and it is also apparent that the slots 9 in the base 8 through which the bolts run will also be sufficiently large to permit of a wide adjustment so that the commutator truing apparatus can be suitably mounted without difficulty wherever it is needed.

The base 8 is provided with a suitable downwardly depending web 10 at its commutator end which stiffens and protects the structure. It also has suitable upwardly extending webs which reinforce the upper part of the base and support the machine. The principal web is the web 11 which runs vertically and near the rear edge and longitudinally of the base 8, and this web is reinforced by transversely and diagonally extending webs 12 and 13 and a longitudinally extending web 14. The front of the machine near the commutator end is also provided with suitable parallel and reinforcing webs 15 which reinforce a transversely extending web 16 which runs diagonally and upwardly and carries an idle pulley, as will appear below.

As shown in Fig. 3, the web 11 is enlarged at its lower end and provided with a bolt 17 which secures the lower end of the plate 18, the upper end of which is secured by suitable cap screws 19 which pass through slots 20 in the web 11. These slots 20 could be dispensed with and holes substituted, but if this were done it would be difficult to erect the machine and so the slots are preferable. The plate 18 is provided with a central and vertically disposed hole or perforation, and above this is a vertically disposed journal bearing in which is placed the vertically disposed shaft 21 which has a crank 22 secured to its upper end in the conventional manner, and a screw thread 23 on its lower. Above the screw thread is a suitable collar 24 which is fixed in place by any suitable means, as a pin. The plate 18 also has suitable flanges 25 which are made integral therewith and are adapted to be engaged by a guide 26 which has a projection 27 which is suitably perforated and thereto threaded to fit the screw threads 23 so that the guide 26 may be raised or lowered by turning the crank 22 in one direction or the other.

The guide 26 carries the major portion of the mechanism of my improved grinding apparatus. This guide 26 is horizontally disposed throughout the greater portion of its length and is suitably grooved so as to form a guideway for a slide 28, as will appear below. The guide 26 carries two transverse webs 29 and 30 adjacent to the plate 18, and these webs 29 and 30 are united by a suitable cover 31 which is held in place by suitable cap screws 32, or other suitable means. Below the webs 29 and 30, but not immediately below the same and at the lower edge of the guide 26, are other webs which run forwardly and upwardly. These webs are 33 and 34 respectively and are suitably perforated to receive a shaft 35 which carries an idle and flanged guide pulley 36, for a purpose that will appear below. The guide 26 also has vertically disposed webs 37 at each flange 25 and suitable bars 38 are secured to these webs by means of screws 39, or otherwise, so that the guide 26 is held properly. It may be further held and adjusted by means of suitable set screws 40 which press against suitable gibs or guides, should such adjustments be necessary.

The slide 28 is secured in its proper position in the groove by a removable lower edge 41 secured by cap screws 42 in the conventional manner, these cap screws running into the main portion of the guide 26.

From the foregoing it is apparent that after the base 8 has been adjusted to the approximate height by means of the washers 7, the exact adjustment of the apparatus in a vertical plane is effected through the crank 22 and the parts connected therewith, and when this adjustment is perfected, the parts may be locked by tightening screws 40, if so desired.

The slide 28 is considerably longer than the guide 26 and runs in the guide 26 in a horizontal direction, either way. This slide 28 fits the guide 26 without lost motion so that it runs true at all times. At the commutator end, the slide 28 is provided with a forwardly extending projection, or bearing 43, at the lower end of which is a bearing 44 for the main shaft 45 of the machine on which the grinding wheel 46 is mounted in the conventional manner. This bearing 44 is preferably provided with an oil cup 47 of the usual form secured in the conventional way. Above the bearing 44 is a second bearing 48 in which a screw shaft 49 can oscillate, as will appear below. Diagonally above the bearing 48, that is, in a higher plane and at one side, is a third bearing 50 in which is fixed one end of the reversing rod 51 by set screws 52, or other suitable means. The rod 51 is not straight but has laterally extending parts which come into the supports in the ends, one of these laterally extending parts coming into the bearing 50 on its rear face so that this rod 51 does not lie over the rack screw or the shaft 45. A bearing 53 is also above the bearing 48 and substantially in the plane of the rod 51, in which is journaled one end of a shaft 54 which revolves freely in said bearing. The other end of the slide 28 is provided with a housing 55 in the lower end of which is journaled the shaft 45 and above this the rack screw 49, the shaft 54 and the bar 51 are held, the latter in a longitudinally projecting extension 56. The bearing 57 of the main shaft 45 is also, preferably, extended in a longitudinal direction so as to provide an ample journal for this shaft which revolves at a very high speed, say 2,500 revolutions a minute. This end of the main driving shaft is lubricated by a suitable oil cup 47 shown.

The interior of the housing 55 is provided with a vertically disposed shaft 58 which has suitable bearings in the said housing and at its lower end is provided with a worm gear 59 that meshes with the threads of a worm 60 fixed on the shaft 45. The upper end of the shaft 58 has a spiral gear 61 fixedly mounted thereon which meshes with a second spiral gear 62 fixed to the shaft 54 and drives the same.

The end of the shaft 49 (that is the end of the rack screw) is provided with a small lever 63 which is fixed thereon in any suitable manner, and at one side is provided with a hollow lug 64 in which is a coiled spring 65 which presses a small plunger 66 into suitable recesses on the exterior of the housing 55 so that the rack screw 49 may be fixedly held in either of two positions, one an operative and the other an inoperative position. The operative position is when the screws of this bar engage a worm. The inoperative position is when a slot 67 comes in contact with the screw mechanism, which will be described below.

The shaft 54 is provided with a longitudinal key-way in which slides a suitable key 68 which is fixed in a collar 69 that slides freely on said shaft and rests between the projections 29 and 30. A gear wheel 70 is placed next the partition 30 and between it and said collar 69, and a second gear wheel 71 is also placed next the projection 29 and between it and the collar 69. This collar 69 has a second collar 72 mounted thereon with an annular recess adapted to receive a pin on a lever, and projecting teeth 73 adapted to engage corresponding teeth 74 on the gear, so that by shifting collar 72 either the gear 70 or the gear 71 may be driven by the shaft 54. In its intermediate position all the teeth 73 are out of engagement and then there is no rotation of the gears 70 and 71 because of the shaft 54.

As shown in Fig. 11, the gear 71 drives a gear 76 mounted on a suitable stud shaft 77, and the gear 76 drives a second gear 78 fixedly mounted on a suitable shaft 79 that is journaled in the projections 29 and 30. The gear 70 drives a spur gear 80 which is also fixedly mounted on the shaft 79 and between the gears 78 and 80 is a worm 81 fixed on the shaft 79 which is adapted to engage a rack screw 49 and meshes with the same, except when the recess 67 is adjacent to said worm 81, at which time there is no mesh.

From the foregoing it is apparent that the worm gear 81 may be driven in either of two directions, depending on whether it is driven by the gear 70 or the gear 71, and either the gear 70 or the gear 71 may be driven by the shaft 54.

The collar 72 is shifted by means of a lever 82 which is pivotally mounted from the cover 31 by a screw 83 and is provided with two additional screws 84 that take in the annular groove 85 of the collar 72. It is preferable to have these screws 84 so that they will be diametrically opposite, and the lever 82 is extended as shown in Fig. 83, for this purpose. This lever 82 is provided with a perforation under the perforation 86 of the cover 31 so that if it is desired to shift the grinding wheel by hand, as is sometimes desirable, a pin may be dropped through the perforation 86 into the corresponding perforation below the same whereby the lever 82 is locked in its lower position so that neither of the gears 70 nor 71 are operative to drive the mechanism to which they are connected. Beyond the rear edge of the cover 31 the lever 82 is bifurcated at 87 and provided with two arms in which are pins 88 that take in an annular groove 89 of a collar 90 that slides freely on the shaft 51.

The collar 90 slides freely on the shaft 51 until it engages the coiled spring 91, or the coiled spring 92, both of which are mounted on the shaft 51 and secured in position by means of collars 93 and 94 respectively, which are fixed in any desired position by means of set screws 95. The springs 91 and 92 are compressed considerably by the collar 90 and are made weak for this purpose. When they are compressed as much as possible the collar is in rigid contact with the fixed collar to which the spring is attached and then is shifted by a further movement of the slide 28 and the spring then accelerates the shifting so that it takes place promptly. It is to be noticed that the collars 93 and 94 are of varying diameter so as to permit a firm contact with the collar 90, and, at the same time to make provision for the spiral springs. The collars 93 and 94 are set according to the width of the commutator to be trued.

The driving mechanism of my improved machine contains a driving roller 96 the tread of which is adapted to rest on the commutator 97 which is being trued and is driven thereby. This roller 96 may be made of any suitable material and in any suitable form, but is preferably as made with a rubber tread divided into two parts 98 and 99, each of which has a dove-tailed fit with corresponding grooves in the metal 100 of the roller 96, and both are held in place by suitable annular rings 101 and 102 which are secured in place by suitable screws 103. A driving wheel, made as just above described, has an insulating and soft material between the commutator and the metal, which is highly desirable, and which also has a rubber tread which can be readily removed and thereby permit replacing whenever required. The driving wheel 96 is on a suitable shaft 104 which is fixed thereto and is journaled in a suitable bearing 105, which is between the driving wheel 96 and a spur gear 106. The spur gear 106 meshes with a second spur gear 107 on a shaft 108 mounted in a bearing 109 which is connected to the bearing 105 by a suitable support 110. The shaft 108 does not revolve and the gear 107 is not fixed thereto but is fixedly connected to a pulley 111 which carries a belt 112 that runs over an idle pulley 113 fixed on a shaft 114 which is fixed in the projection 16, as shown, and is adjustably mounted therein so as to permit the slack to be taken out of the belt 112. From the pulley 113 the belt 112 passes to a cylinder 115 fixedly mounted on the shaft 45, and from thence over an idle pulley 36 mounted on a suitable shaft 35, as described above. The bearing 109 is slit at 116 and provided with a bolt 117 whereby it may be clamped upon the lever 118 and hold the same firmly. The lever 118 is slightly bent as shown and formed of two parts connected by interengaging teeth which permit of an accurate adjustment of the parts, and fulcrumed at 119 and near its rear end is provided with a pin 120 which is secured to a coiled spring 121, which is also secured at its upper end to a pin 122 that is fixed in a web 13. This web 13 also carries a projection 123 on which is fulcrumed a small hand lever 124 by means of a bolt 125, the lower end of which is adapted to enter a recess 126 in the lever 119, as indicated in Fig. 6, so that when the handle of the lever 124 is lifted and the other end of this lever is depressed, the rear end of the lever 118 is also depressed against the action of the spring 121, and by so doing the driving wheel 96 is lifted from the commutator under treatment.

Oil cups 47, identical with the ones shown above, or substantially the same, are applied to all bearings, wherever possible, so as to facilitate lubrication.

The mechanism above shown and described will true a commutator in position, but it will not operate to the best advantage because the abrading material from the commutator is thrown or blown in all directions and some of it will enter the windings of the armature where damage may result from this cause. It is therefore important that this material should be removed so that no damage can result from this cause. This material is removed by means of the hood 127, which is made of some insulating material such as leatheroid or vulcanite, and is preferably shaped as shown in Fig. 10, and provided with a mounting bar 128 to which it is secured by means of suitable screws 129. This bar 128 is preferably shaped substantially as shown in Fig. 10, that is, with a horizontal portion 130 and a second horizontal portion 131 running laterally therefrom, and a vertical portion 132 which is slotted at 133 to receive a bolt. Below this is a horizontal part 134 which connects with a vertical part 135 that runs to the arch 136 and this, in turn, runs into the part 137, which connects with the horizontal portion 138, and this is bent laterally to form the part 139, which is bent upwardly to form a second vertical part 140 with a slot 141. This vertical portion 132 rests firm against the end of the slide 28, and the vertically disposed portion 140 of this bar also rests against this slide where it is secured by means of suitable bolts 142. The space between the parts 135, 136 and 137 partially inclose an opening. The opening 143 of the hood 127 is connected by a suitable pipe or hose to an exhaust fan or pump, not shown, which removes the debris as fast as formed and prevents any accumulation about the machine whose commutator is being trued, and this is done without in any way interfering with the operation of the machine as the hood always moves with the cutting or abrading tool, but out of contact with the same.

In view of the foregoing, the erection and operation of my improved apparatus will be readily understood.

It is erected by removing the cover bolts and substituting in lieu thereof the cover bolts 4 which hold the horse shoe bars 5. On these horse shoe bars 5 are placed washers 7 and through them are passed the bolts 6, and in this way the bed 8 of the machine is put in position. Assuming that the machine whose commutator is to be trued is one of the difficult to true, that is a rotary alternating direct transformer, where the machine must be trued while the commutator is charged or "alive", in this event, the washers 7 should be made of insulating material and the bolts 6 should be carefully insulated from both the horse shoe bars 5 and the bed plate 8. This precaution is not necessary where the commutator is run by a steam engine in its uncharged condition. When the bed 8 is in place, the slide 18 is next put in position and secured by means of the bolts 17 and 19, and at the same time the lever 118 is put in place with the parts connected thereto. The lever 124 is thrown so that the driving wheel 96 is off the commutator. When in this position the crank 22 is adjusted until the grinding mechanism has the desired elevation, then the hand lever 63 is thrown so as to throw the worm 81 out of engagement with the screw rack bar and then the slide 28 may be shifted until the wheel 46 is over a part of the commutator to be trued. The stops 93 and 94 are then set so that the grinding wheel will traverse the proper part of the commutator, and then the lever 124 is shifted to lower the driving wheel 96 on the commutator and the handle or crank 22 is turned so as to lower the grinding wheel until it rests on the commutator with the proper pressure. It is not allowed to rest on the commutator until the commutator has attained full speed, which in many instances will approach the peripheral velocity of a mile a minute. The driving wheel 96 is driven at a corresponding speed and the pulley 111 at a considerably lower speed because the gear 106 is, in this instance, smaller than the gear 107. If the commutator has a slow speed the gears 106 and 107 would have to be changed accordingly so that the grinding wheel when in operation will have a velocity of between 1800 and 2500 revolutions a minute. The grinding wheel runs in the same direction as that of the commutator. The lever 82 is then thrown so as to place the collar 72 so that one or the other set of pins 73 will be in contact and the handle 63 is thrown so that the rack bar meshes with the worm 81. The slide 28 and the parts carried thereby then move freely in one direction or the other until the spring on the rod 51 is compressed, as above described, and when this spring is sufficiently compressed to enable one of the stops to act the lever 82 is thrown abruptly and makes a corresponding quick shift of the direction of feed, thereby preventing the commutator from being too deeply grooved at one part. The abraded material from the commutator is removed, as above described, and continues to be removed while the machine is in operation. The machine continues to operate until the commutator is sufficiently true at the speed of operation, and then my improved apparatus is removed from the machine being trued by first raising the abrading wheel by turning the crank 22, and then lifting the driving wheel through the lever 124 and finally removing the parts in the reverse order from that in which they were assembled. In many instances it is necessary to remove some of the brushes of the machine being trued so as to give sufficient access to the commutator. This step was not described, as it is obvious that it is sometimes unnecessary.

When my machine is used on a lathe, the mount may be correspondingly changed, as is obvious.

While I have shown and described one embodiment of my invention, it is obvious that it is not restricted thereto, but is broad enough to cover all structures that come within the scope of the annexed claims.

What I claim is—

1. In a machine of the class described, cover bolts securing horse-shoe bars adjacent to the journal of the dynamo electric machine, bolts with washers strung thereon extending upwardly from said horse-shoe bars and a base plate resting on said washers and secured by said bolts.

2. In a machine of the class described, horse-shoe bars and means for securing the same to the bed of an electric machine, bolts extending upwardly from said bars and insulated therefrom, washers of insulating material surrounding said bolts, a bed plate resting on said washers and secured by said bolts.

3. In a machine of the class described, a rotary abrading wheel adapted to smooth the commutator and means for rotating the same, means for feeding said abrading wheel transversely of said commutator and means substantially covering said abrading wheel and moving with the same but not interfering with the operation of the same for exhausting the abraded fragments from the commutator at all times while the same is being trued.

4. In a machine of the class described, a rotary abrading wheel and means for rotating the same, means for supporting said wheel, means for driving said wheel, means for moving said wheel transversely of a commutator, a hood with an iron bar secured thereto having horizontally and vertically disposed parts adapted to be secured to a portion of said wheel support so that the abrading wheel may move freely without interference.

5. In a machine of the class described, a base and means for mounting the same on an electric machine and adjacent to the commutator thereof, vertically disposed webs rising from said base, means for mounting a guide so that it can move vertically on one of said webs, laterally extending partitions running from said guide, a slide adapted to move to and fro in said guide, shafts on said slide adapted to pass through said partitions and means connected to said shafts and partitions for driving said slide to and fro.

6. In a machine of the class described, a slide with a bearing at one end and a housing at the other, parallel shafts connecting said bearing and housing, one of said shafts being a driving and the other a driven shaft, mechanism in said housing connecting the driving and driven shafts, and means whereby said slide may be moved through the driven shaft, and means for mounting said slide so that it can move in the direction of its length.

7. In a machine of the class described, a guide having laterally disposed partitions extending therefrom, a slide adapted to move in said guide, a bearing at one end of said slide and a housing at the other, shafts connecting said housing and bearing one above the other, the lowest of said shafts having a drum mounted thereon, means for driving said drum, a worm in said housing and on the shaft with the drum and worm gear meshing with said worm, a vertically disposed shaft journaled in said housing, the spiral gear fixed to said vertically disposed shaft, the second spiral gear meshing with the other spiral gear and fixed to the uppermost shaft running between said housing and bearing, gears mounted on said last mentioned shaft and placed between said partitions, a clutch adapted to fix one or the other of said gears on said last mentioned shaft, or adapted to leave both free, a screw rack connecting said bearing and housing, a worm journaled between said partitions and means connecting said worm with either of said gears so that they will be driven in one direction by one gear and in the opposite direction by the other gear, and means for throwing said gears into engagement with the last mentioned driving shaft so that either gear may be driven by said shaft or neither may be driven by said shaft.

8. In a machine of the class described, a bed plate and webs secured thereto, one of said webs being perforated and having bolt slots, a guide plate with bolts extending through said perforation and slots, a guide mounted on said guide plate, and means for permitting the said guide to have a vertical movement, a guideway in said guide and a slide mounted in said guideway and adapted to have a horizontal movement, a driving shaft, a rack bar and a rotary drum carried by said slide, a shaft carrying said drum and a belt with means for driving the same, mounted on the machine and adapted to engage said drum.

9. In a machine of the class described, means for attaching the machine to the electric machine and adjacent to the commutator thereof, a base secured to said attaching means, vertically disposed perforated and slotted webs rising from said base, a plate secured to said webs by bolts passing through said perforation and slots, a guide secured to said plate and adapted to move vertically thereon, a horizontally disposed slide moving in said guide and means for moving the same to and fro.

10. In a machine of the class described, a slide and means for supporting the same so that it may be moved in the direction of its length, a bearing at one end of said slide and a housing at the other, a shaft connecting the lower portions of said bearing and housing with a drum fixed thereon, a guide supporting said slide and partitions and brackets extending from said guide, guide pulleys mounted on said brackets, a driving wheel adapted to rest on the commutator being trued, and means connecting said driving wheel with a pulley whereby the said pulley is driven at a speed proportional to the peripheral velocity of the commutator, a belt connecting said pulleys and drum, a top shaft connecting said bearing and housing, mechanism in said housing connecting the drum shaft at the bottom with the top shaft whereby the drum shaft will drive the top shaft, a rack-screw connecting the bearing and housing intermediate of the two shafts, a worm carried between said partitions and adapted to contact with said rack bar, means for connecting said top shaft with said worm, including a clutch, so that said worm may be driven in either direction, and means for throwing said rack bar either into or out of engagement with said worm.

11. In a machine of the class described, a base, a lever pivoted thereto, a driving wheel mounted on said lever and adapted to rest on a commutator and be driven by the same, a recess in said lever, a second lever mounted on a vertically disposed web extending from said base and adapted to engage the other lever in said recess or near said recess, and a spring adapted to cause the two levers to engage.

12. In a machine of the class described, a top shaft and means for driving the same, partitions through which said shaft slides and means for supporting said partitions, a rack screw and means for mounting the same parallel to said shaft, a worm mounted between said partitions and a clutch between said partitions and adapted to connect said worm with said rack screw so that said shaft may drive said worm in either of two directions, and means for automatically throwing the clutch from one position to the other.

13. In a machine of the class described, a bearing and a housing and parallel top shafts and a rack screw uniting the same, one of said shafts being fixed and the other rotary, means for rotating the rotary shaft, a clutch mechanism, means connecting the rotary shaft with the rack screw whereby said rotary shaft may be driven in the direction of its length in either direction, stops with springs mounted on said fixed shaft and means for connecting said stops and clutch whereby the direction of movement of the rotary shaft may be reversed.

Signed at the city of New York county of New York State of New York this 7th day of September, 1910.

THOMAS E. CHAPPELL.

Witnesses:
GUSTAVE I. ARONOW,
O. E. EDWARDS, Jr.

Copies of this patent may be obtained for five cents each, by addressing the "Commissioner of Patents, Washington, D. C."